J. H. GLEDHILL.
CABLE CLAMP.
APPLICATION FILED JUNE 7, 1916.

1,223,961. Patented Apr. 24, 1917.

Inventor:
John H. Gledhill
By C. R. Butler
Attorney

UNITED STATES PATENT OFFICE.

JOHN H. GLEDHILL, OF PHILADELPHIA, PENNSYLVANIA.

CABLE-CLAMP.

1,223,961.　　　Specification of Letters Patent.　　Patented Apr. 24, 1917.

Application filed June 7, 1916. Serial No. 102,123.

*To all whom it may concern:*

Be it known that I, JOHN H. GLEDHILL, a citizen of the United States, residing in the city of Philadelphia, county of Philadelphia, and State of Pennsylvania, have invented certain Improvements in Cable-Clamps, of which the following is a specification.

This invention is a device adapted for clamping, as also anchoring, electric cables. Its primary object is to provide a simple, convenient, symmetrical, and efficient construction so designed that its axis and anchorage are in direct line with the section of the cable clamped thereby, with the strains equally distributed, and so that the cable can be carried off at angles on either side of an axial plane through the clamp and its anchorage, between the latter's anchoring bifurcations. The clamp has the further advantage that it can be readily taped and insulated.

The characteristic features of my improvements are fully disclosed in the following description and the accompanying drawings in illustration thereof.

Figure 1:
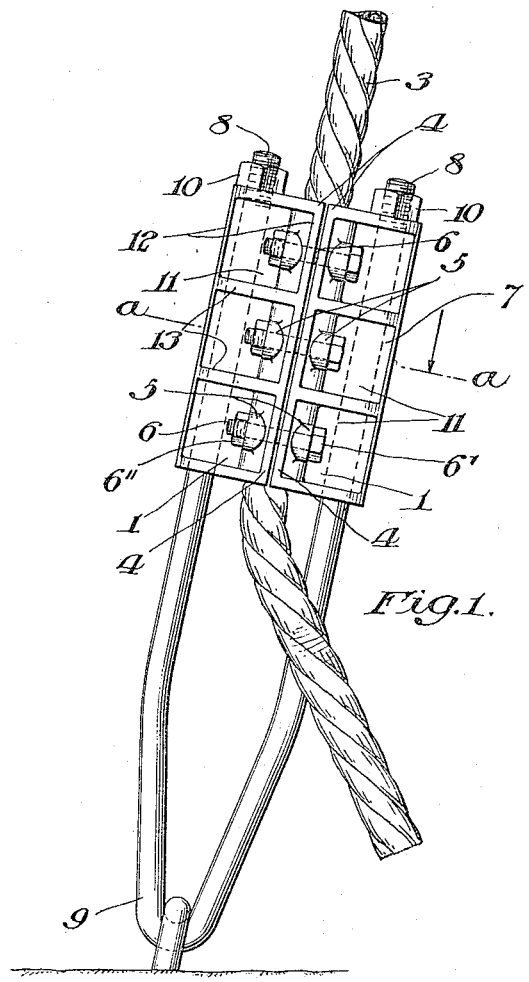
Figure 2:
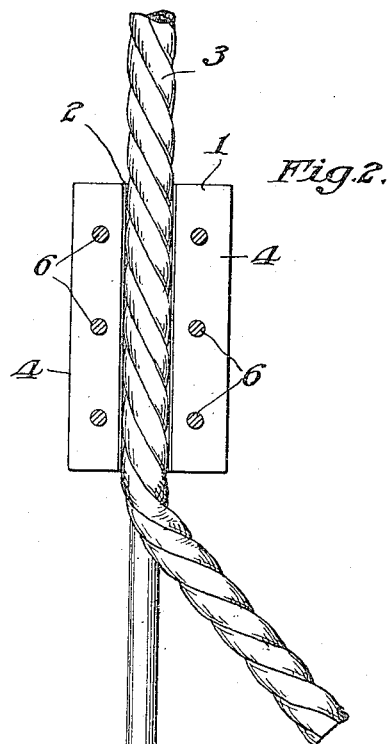
Figure 3:
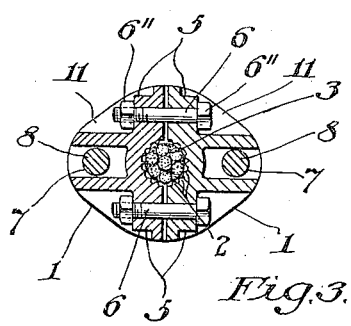
Figure 4:
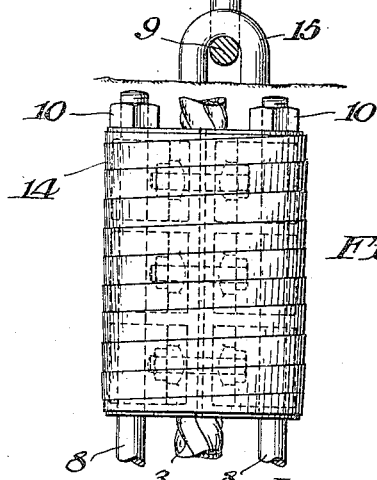

In the drawings, Figure 1 is an elevation of an embodiment of my invention; Fig. 2 is a transverse sectional view of the same; Fig. 3 is a sectional view taken on the line a—a of Fig. 1; and Fig. 4 is an elevation of part of the device showing the clamp jaws wrapped with insulating tape.

The device, as illustrated in the drawings, comprises the similar jaws 1 having the spirally fluted or roughened complementary longitudinal channels 2 forming a bore or seat for the cable 3, the complementary bearings 4 containing alined apertures 5 for the passage of bolts 6 by which the jaws are clamped on the cable, and the longitudinal channels 7 adapted to receive the bifurcations 8 of a clevis 9 which is engaged to the jaws by nuts 10, the jaws and the clevis being symmetrically disposed with reference to the section of the cable clamped.

The jaws 1, when joined, are substantially oval in end elevation and are provided with recesses 11 for receiving the heads 6' and nuts 6'' of the bolts 6, which are disposed between parallel longitudinal ribs 12 and transverse ribs 13 intersecting them, the two sets of bolts being disposed at right angles to the bifurcations of the clevis and on opposite sides thereof.

Insulating tape 14 can be conveniently wound around the construction and is supported by the ribs 12 and 13 which form a comparatively regular bearing therefor.

It will be understood that the clevis can be anchored in any suitable way, as by a staple 15 driven into a post, beam or the like.

Having described my invention, I claim:

1. A cable clamp comprising a pair of similar jaws having complementary longitudinal channels providing a seat, means for clamping said jaws together, and a clevis having bifurcations extending through said jaws and disposed symmetrically with reference to the plane of juncture thereof.

2. A cable clamp comprising jaws having respective longitudinal openings, complementary longitudinal channels providing a seat between said openings and bearings containing apertures, bolts passing through said apertures transverse to said aperture first named and engaging said bearings to hold said jaws together, said jaws having intersecting ribs forming recesses in which the extremities of said bolts are disposed.

3. A cable clamp comprising jaws having complementary channels forming an axial seat extending longitudinally thereof, a clevis having bifurcations extending through the respective jaws on opposite sides of a plane between them, and means for clamping said jaws together.

4. A cable clamp comprising a plurality of jaws having complementary channels forming a seat and ribs forming recesses, said ribs providing a substantially regular bearing, bolts connecting with said jaws and having their terminals within the recesses formed by said ribs, a clevis having furcations connected with the respective jaws, and insulating means wrapped around and supported by said ribs.

5. A cable clamp comprising means for seating and gripping a cable, said means comprising a pair of similar parts symmetrical with respect to a plane of juncture, in combination with anchoring means having a bearing in line with the cable seated in said means first named and furcations passing through the respective parts aforesaid.

6. A cable clamp having similar jaws each provided with an open channel and an aperture parallel to said channel, in combination with a clevis having furcations fixed in the apertures of the respective jaws, and means for clamping said channels on a cable and fixing said jaws together, said channels and apertures being symmetrically arranged with reference to said cable.

In testimony whereof I have hereunto set my name this 25th day of May, 1916.

JOHN H. GLEDHILL.

Copies of this patent may be obtained for five cents each, by addressing the "Commissioner of Patents, Washington, D. C."